(12) United States Patent
Dorner et al.

(10) Patent No.: US 9,659,032 B1
(45) Date of Patent: May 23, 2017

(54) BUILDING A PALETTE OF COLORS FROM A PLURALITY OF COLORS BASED ON HUMAN COLOR PREFERENCES

(71) Applicant: Amazon Technologies, Inc., Reno, NV (US)

(72) Inventors: Charles Shearer Dorner, Seattle, WA (US); Jenny Ann Blackburn, Seattle, WA (US); Eva Manolis, Bellevue, WA (US); Timothy Andrew Ong, Sammamish, WA (US); Paul Barnhart Sayre, III, Gig Harbor, WA (US)

(73) Assignee: Amazon Technologies, Inc., Seattle, WA (US)

( * ) Notice: Subject to any disclaimer, the term of this patent is extended or adjusted under 35 U.S.C. 154(b) by 357 days.

(21) Appl. No.: 14/316,442

(22) Filed: Jun. 26, 2014

(51) Int. Cl.
*G06K 9/00* (2006.01)
*G06F 17/30* (2006.01)

(52) U.S. Cl.
CPC .... *G06F 17/3025* (2013.01); *G06F 17/30265* (2013.01); *G06F 17/30274* (2013.01)

(58) Field of Classification Search
None
See application file for complete search history.

(56) References Cited

U.S. PATENT DOCUMENTS

| | | |
|---|---|---|
| 5,508,718 A | 4/1996 | Haikin |
| 5,544,284 A | 8/1996 | Allebach et al. |
| 5,684,895 A | 11/1997 | Harrington |
| 5,822,503 A | 10/1998 | Gass, Jr. et al. |
| 6,014,125 A * | 1/2000 | Herbert ............. G06T 3/4015 345/213 |
| 6,081,276 A | 6/2000 | Delp |
| 6,124,945 A | 9/2000 | Ishihara et al. |
| 6,385,336 B1 | 5/2002 | Jin |
| 6,577,759 B1 | 6/2003 | Caron et al. |

(Continued)

FOREIGN PATENT DOCUMENTS

JP 2012-221317 A 11/2012
WO WO 2014/070914 A1 5/2014
(Continued)

OTHER PUBLICATIONS

"Color Blind Assistant." iPhone Apps Versions 2.61 and 2.62; Release date Oct. 14-15, 2009; pp. 1-7.

(Continued)

*Primary Examiner* — Tsung-Yin Tsai
(74) *Attorney, Agent, or Firm* — Knobbe, Martens, Olson & Bear, LLP

(57) ABSTRACT

Systems and methods are described to generate a color palette with color combinations based on human color preferences. One or more input colors can be used to determine affiliated colors based on the presence of colors in color palettes that have been voted on and/or ranked by a community of users. Each affiliated color can be weighted, normalized, and ordered based at least in part on the level of preference for the color palette to which it belongs and the relative popularity of the input colors. A color from the ordered affiliated colors can be selected and added to the custom palette of colors. With the addition of a color, the ordered affiliated colors can be updated to further present colors for inclusion in the custom color palette.

20 Claims, 10 Drawing Sheets

(56) References Cited

U.S. PATENT DOCUMENTS

| | | | |
|---|---|---|---|
| 7,136,074 B2 | 11/2006 | Hussie | |
| 7,444,658 B1 | 10/2008 | Matz et al. | |
| 7,801,893 B2* | 9/2010 | Gulli' | G06F 17/30247 |
| | | | 707/737 |
| 8,416,255 B1 | 4/2013 | Gilra | |
| 8,553,045 B2 | 10/2013 | Skaff et al. | |
| 8,576,241 B1 | 11/2013 | Kanter et al. | |
| 8,634,640 B2 | 1/2014 | Bhatti et al. | |
| 8,762,419 B2 | 6/2014 | Moroney | |
| 8,867,798 B2 | 10/2014 | Shuster | |
| 9,047,804 B1 | 6/2015 | Moroney et al. | |
| 9,135,719 B1 | 9/2015 | Dorner et al. | |
| 9,177,391 B1 | 11/2015 | Dorner et al. | |
| 9,245,350 B1 | 1/2016 | Dorner et al. | |
| 9,311,889 B1 | 4/2016 | Dorner et al. | |
| 9,396,560 B2 | 7/2016 | Dorner et al. | |
| 9,401,032 B1 | 7/2016 | Dorner et al. | |
| 2001/0028464 A1 | 10/2001 | Aritomi | |
| 2002/0080153 A1 | 6/2002 | Zhao et al. | |
| 2003/0004938 A1 | 1/2003 | Lawder | |
| 2003/0011612 A1 | 1/2003 | Luo et al. | |
| 2003/0142124 A1 | 7/2003 | Takata et al. | |
| 2003/0146925 A1* | 8/2003 | Zhao | H04N 1/644 |
| | | | 715/700 |
| 2004/0090453 A1* | 5/2004 | Jasinschi | G11B 27/28 |
| | | | 715/723 |
| 2005/0122427 A1 | 6/2005 | Hougui et al. | |
| 2005/0149411 A1 | 7/2005 | Colwell | |
| 2005/0222978 A1 | 10/2005 | Drory et al. | |
| 2006/0023082 A1 | 2/2006 | Higuchi | |
| 2006/0066629 A1 | 3/2006 | Norlander et al. | |
| 2006/0248081 A1 | 11/2006 | Lamy | |
| 2006/0250669 A1 | 11/2006 | Beretta | |
| 2006/0268120 A1 | 11/2006 | Funakura et al. | |
| 2007/0100786 A1 | 5/2007 | Moroney | |
| 2008/0003547 A1 | 1/2008 | Woolfe et al. | |
| 2008/0025629 A1 | 1/2008 | Obrador et al. | |
| 2008/0025647 A1 | 1/2008 | Obrador et al. | |
| 2008/0046410 A1 | 2/2008 | Lieb | |
| 2008/0069442 A1 | 3/2008 | Itoh | |
| 2008/0301582 A1 | 12/2008 | Gluck | |
| 2008/0317336 A1 | 12/2008 | Mojsilovic | |
| 2009/0027414 A1 | 1/2009 | Vaughn | |
| 2009/0041345 A1 | 2/2009 | Tirumalareddy et al. | |
| 2009/0055758 A1 | 2/2009 | Sim et al. | |
| 2009/0157595 A1 | 6/2009 | Gubitz | |
| 2009/0227375 A1 | 9/2009 | Weisman et al. | |
| 2009/0259567 A1 | 10/2009 | Watts | |
| 2009/0281925 A1 | 11/2009 | Winter et al. | |
| 2010/0027834 A1 | 2/2010 | Spitzig et al. | |
| 2010/0053201 A1 | 3/2010 | Klassen et al. | |
| 2010/0082654 A1 | 4/2010 | Zhang et al. | |
| 2010/0110455 A1 | 5/2010 | Woolfe | |
| 2011/0135195 A1* | 6/2011 | Marchesotti | H04N 1/60 |
| | | | 382/165 |
| 2011/0205231 A1 | 8/2011 | Hartley et al. | |
| 2011/0305386 A1 | 12/2011 | Wang et al. | |
| 2011/0319160 A1 | 12/2011 | Arn et al. | |
| 2012/0036163 A1 | 2/2012 | Myers et al. | |
| 2012/0045121 A1 | 2/2012 | Youngman et al. | |
| 2012/0075329 A1 | 3/2012 | Skaff et al. | |
| 2012/0099788 A1 | 4/2012 | Bhatti et al. | |
| 2012/0109944 A1 | 5/2012 | Hao | |
| 2012/0154420 A1 | 6/2012 | Calandrino et al. | |
| 2012/0163710 A1 | 6/2012 | Skaff et al. | |
| 2013/0013991 A1 | 1/2013 | Evans | |
| 2013/0033603 A1 | 2/2013 | Suzuki et al. | |
| 2013/0050238 A1 | 2/2013 | Bergou et al. | |
| 2013/0148741 A1* | 6/2013 | Steinberg | H04N 19/59 |
| | | | 375/240.25 |
| 2013/0227636 A1 | 8/2013 | Bettini et al. | |
| 2013/0235398 A1 | 9/2013 | Bhatti et al. | |
| 2013/0266217 A1 | 10/2013 | Gershon et al. | |
| 2014/0037200 A1 | 2/2014 | Phillips et al. | |
| 2014/0044349 A1 | 2/2014 | Wang et al. | |
| 2014/0049799 A1* | 2/2014 | Li | H04N 1/4092 |
| | | | 358/3.27 |
| 2014/0052584 A1 | 2/2014 | Gershon et al. | |
| 2014/0067014 A1 | 3/2014 | Kaula et al. | |
| 2014/0089781 A1 | 3/2014 | Hoguet | |
| 2014/0153821 A1 | 6/2014 | Masuko et al. | |
| 2014/0177952 A1 | 6/2014 | Masuko | |
| 2014/0189476 A1 | 7/2014 | Berthelot et al. | |
| 2014/0300775 A1 | 10/2014 | Fan et al. | |
| 2014/0334722 A1 | 11/2014 | Bloore et al. | |
| 2014/0355874 A1 | 12/2014 | Sakamaki et al. | |
| 2015/0235110 A1 | 8/2015 | Curtis et al. | |
| 2015/0235389 A1 | 8/2015 | Miller et al. | |
| 2015/0262549 A1 | 9/2015 | Moroney | |
| 2015/0269747 A1 | 9/2015 | Hogan et al. | |
| 2015/0324392 A1 | 11/2015 | Becker et al. | |
| 2015/0332479 A1 | 11/2015 | Gershon et al. | |
| 2015/0378999 A1 | 12/2015 | Dorner et al. | |
| 2015/0379000 A1 | 12/2015 | Haitani et al. | |
| 2015/0379001 A1 | 12/2015 | Gunningham et al. | |
| 2015/0379002 A1 | 12/2015 | Dorner et al. | |
| 2015/0379003 A1 | 12/2015 | Dorner et al. | |
| 2015/0379004 A1 | 12/2015 | Sayre et al. | |
| 2015/0379005 A1 | 12/2015 | Dorner et al. | |
| 2015/0379006 A1 | 12/2015 | Dorner et al. | |
| 2015/0379071 A1 | 12/2015 | Dorner et al. | |
| 2015/0379608 A1 | 12/2015 | Dorner et al. | |
| 2015/0379731 A1 | 12/2015 | Dorner et al. | |
| 2015/0379732 A1 | 12/2015 | Sayre et al. | |
| 2015/0379733 A1 | 12/2015 | Dorner et al. | |
| 2015/0379738 A1 | 12/2015 | Gunningham et al. | |
| 2015/0379739 A1 | 12/2015 | Dorner et al. | |
| 2015/0379743 A1 | 12/2015 | Dorner et al. | |
| 2015/0379959 A1 | 12/2015 | Dorner et al. | |
| 2016/0005188 A1 | 1/2016 | Dorner et al. | |
| 2016/0005201 A1 | 1/2016 | Kunkel et al. | |
| 2016/0104303 A1 | 4/2016 | Dorner et al. | |
| 2016/0335784 A1 | 11/2016 | Dorner et al. | |

FOREIGN PATENT DOCUMENTS

| | | |
|---|---|---|
| WO | WO 2015/200502 A1 | 12/2015 |
| WO | WO 2015/200505 A1 | 12/2015 |
| WO | WO 2015/200509 A1 | 12/2015 |
| WO | WO 2015/200515 A1 | 12/2015 |
| WO | WO 2015/200523 A1 | 12/2015 |

OTHER PUBLICATIONS

"Color Name & Hue." Wayback Machine Archive; May 16, 2013; pp. 1-17. <http://web.archive.org/web/20130516202647/http://www.color-blindness.com/color-name-hue>.

"HTML Color Picker," Wayback Machine Archive; Feb. 15, 2013; 1 page. <http://web.archive.org/web/20130215181242/http://imagecolorpicker.com/>.

"Tin Eye Labs." Wayback Machine Archive; Sep. 20, 2012; pp. 1-3. <http://web.archive.org/web/20120920051712/http://labs.tineye.com/color/>.

Delon, J., et al., Automatic Color Palette, Proceedings of the International Conference on Image Processing, vol. 2, Sep. 11-14, 2005, pp. 706-709.

Nickerson, D., et al., Central Notations for ISCC-NBS Color Names, Journal of the Optical Society of America, vol. 31; pp. 587-591; Sep. 1941.

"Exalead CloudView Semantics Whitepaper," Doc. No. EN.140.001.0-V1.2; Oct. 2010, pp. 1-30. Retrieved from http:www.3ds.com/fileadmin/PRODUCTS/EXALEAD/Documents/whitepapers/Exalead-CloudView-Semantics-EN.pdf on Aug. 24, 2015.

Bell, E., Color Detection: Technology on Heels With Lyst Engineering, dated Feb. 22, 2014, retrieved Apr. 7, 2014, <http://developers.lyst.com/data/images/2014/02/22/color-detection/>.

Beretta, Giordano B., et al.; "Harmonious colors: from alchemy to science," Color Imaging XVII: Displaying Processing, Hardcopy, and Applications, SPIE vol. 8292, No. 1, pp. 1-7; Bellingham, WA; Jan. 22, 2012.

(56) References Cited

OTHER PUBLICATIONS

Csurka, Gabriela, et al.; "Learning moods and emotions from color combinations," Proceedings of the Seventh Indian Conference on Computer Vision, Graphics and Image Processing, pp. 298-305; New York; Dec. 12, 2010.

Das et al., "Indexing flowers by color names using domain knowledge-driven segmentation," Proc. The Fourth IEEE Workshop on Applications of Computer Vision; pp. 94-99; 1998.

Dorner, C.S., Image-Based Color Palette Generation, U.S. Appl. No. 14/316,483, filed Jun. 26, 2014.

Dorner, C.S., Automatic Image-Based Recommendations Using a Color Palette, U.S. Appl. No. 14/316,268, filed Jun. 26, 2014.

Global Color Survey, http://www.colorcom.com/global-color-survey, Feb. 1, 2001, accessed Sep. 11, 2015.

Heer, Jeffrey, et al.; "Color naming models for color selection, image editing and palette design," Proceedings of the 2012 ACM Annual Conference on Human Factors in Computing Systems, pp. 1007-1016; New York; May 5, 2012.

Lawder, Jonathan, "The Application of Space-filling Curves to the Storage and Retrieval of Multi-dimensional Data," PhD thesis; Sections 4.3.5.1, p. 68, and 6.5, pp. 121-130; Jan. 1, 2000.

Luo, J., et al., "Novel Color Palettization Scheme for Preserving Important Colors," Proceedings SPIE 5008. Color Imaging VIII: Processing, Hardcopy, and Applications; Jan. 20, 2003.

Montagne, C., et al., "Adaptive Color Quantization Using the Baker's Transformation," J. Electronic Imaging 15(2), Apr.-Jun. 2006, 21 pages.

Periasamy, P.S., et al., "A Common Palette Creation Algorithm for Multiple Images with Transparency Information," Proceedings of the International Conference on Advances in Computing, Control, and Telecommunication Techologies, IEEE 2009.

Tremeau et al., "A vector quantization algorithm based on the nearest neighbor of the furthest color," Proceedings of International Conference on Image Processing, vol. 3, pp. 682-685, Oct. 26-29, 1997.

Tropf, H. et al., "Multidimensional range search in dynamically balanced trees," Angewandte Informatik (Applied Informatics), pp. 71-77; Braunschweig, Germany; Feb. 1, 1981.

Wang et al., "Contextual Dominant Color Name Extraction for Web Image Search," 2012 IEEE International Conference on Multimedia and Expo Workshops (ICMEW), pp. 319-324.

Yu, M.P., et al., "Contextual Algorithm for Color Quantization," J. Electronic Imaging 12(3):442-447, Jul. 2003.

Zhu, Haiping, et al., "Deep into Color Names: Matching Color Descriptions by Their Fuzzy Semantics," Artificial Intelligence: Methodology, Systems, and Applications Lecture Notes in Computer Science; Lecture Notes in Artificial Intelligence, pp. 138-149; Jan. 1, 2006.

International Search Report and Written Opinion in PCT/US2015/037469 mailed on Oct. 1, 2015.

International Search Report and Written Opinion in PCT/US2015/037456 mailed on Sep. 9, 2015.

International Search Report and Written Opinion in PCT/US2015/037494 mailed on Sep. 14, 2015.

International Search Report and Written Opinion in PCT/US2015/037465 mailed on Oct. 27, 2015.

International Search Report and Written Opinion in PCT/US2015/037481 mailed on Sep. 14, 2015.

Balasubramanian, Raja, et al.; Sequential Scalar Quantization of Color Images, Journal of Electronic Imaging, vol. 3, No. 1, pp. 45-59; Jan. 1994.

Das et al, Indexing Flower Patent Images Using Domain Knowledge, IEEE Intelligent Systems, vol. 14, No. 5; 1999; pp. 24-33.

\* cited by examiner

BUILDING A PALETTE OF COLORS FROM A PLURALITY OF COLORS BASED ON HUMAN COLOR PREFERENCES

BACKGROUND

Items that create a visual impression generally utilize color, at least in part, to generate the visual impression. A palette of colors can be used, e.g., with clothes, artwork, images, video, and other visual media to provide a certain or desired look and feel. The particular colors that make up an individual color palette can be selected based on a variety of criteria such that the resulting palette generates the overall desired visual impression.

BRIEF DESCRIPTION OF THE DRAWINGS

Aspects and advantages of the embodiments provided herein are described with reference to the following detailed description in conjunction with the accompanying drawings. Throughout the drawings, reference numbers may be re-used to indicate correspondence between referenced elements. The drawings are provided to illustrate example embodiments described herein and are not intended to limit the scope of the disclosure.

DETAILED DESCRIPTION

Figure 1:
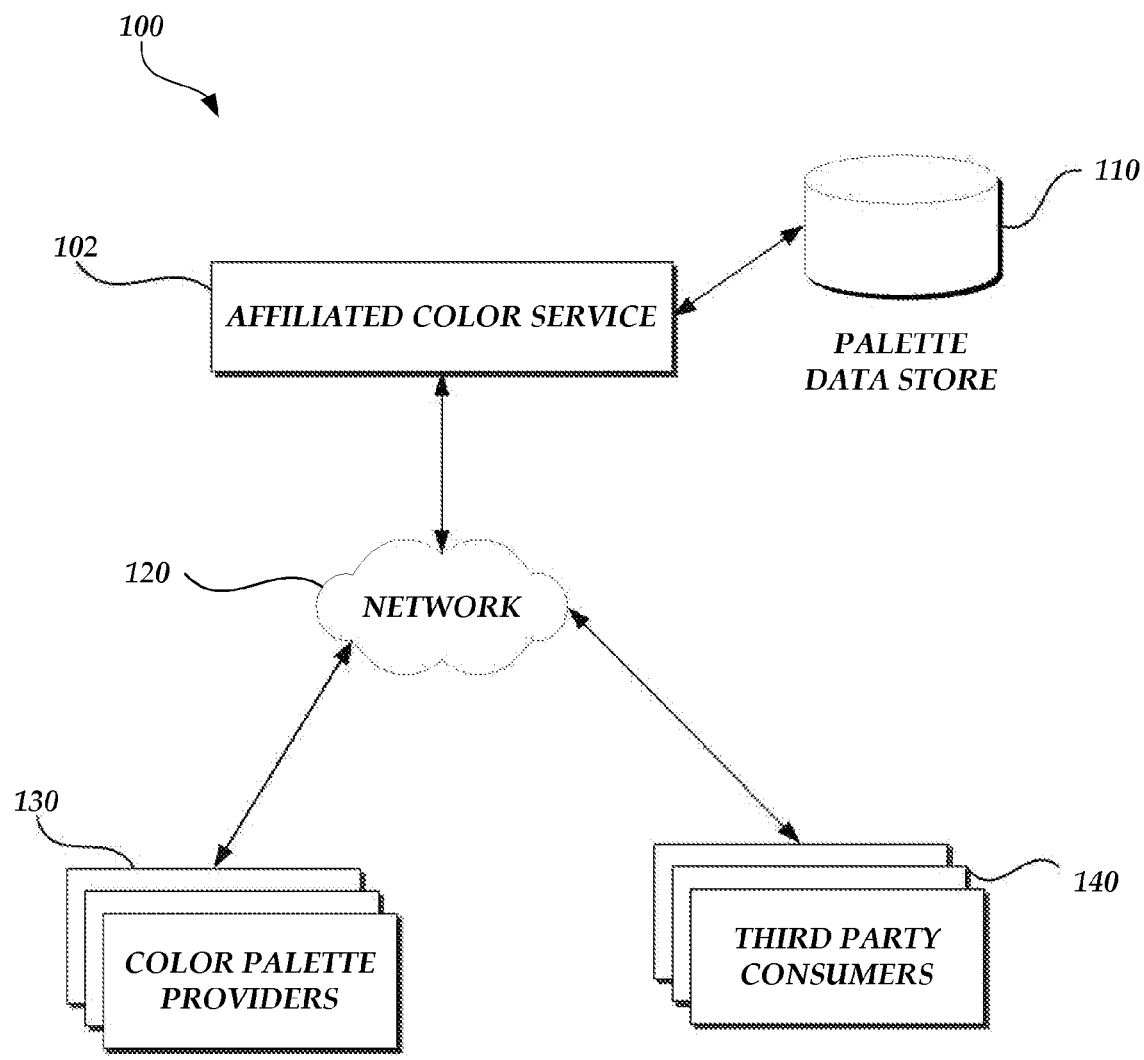
FIG. 1 illustrates a block diagram of an example operating environment that includes an affiliated color service to generate a color palette based at least in part on an input color or colors.

Generally described, aspects of the present disclosure relate to building a palette of colors using color palettes that have been ranked or voted on by people to indicate which combinations of colors are more preferable, visually appealing, popular, or the like. The present disclosure includes systems and methods configured to identify colors affiliated with an initial color or colors based at least in part on human color preferences. A color palette can be built using identified affiliated colors.

Palettes of colors can be used to design visual articles, such as artwork or clothes, so that the article is visually appealing. This can increase the desirability of the article. In addition, palettes of colors can be used to evoke targeted reactions or emotions which are associated with a look and feel of a visual presentation or article. For example, the colors of clothes can be selected to reflect trends in colors or to reflect a more classic or timeless look.

Systems may be designed to automatically generate color combinations based on one or more input colors. These systems may use algorithms to determine complementary colors, similar colors, colors arranged in a color space to cover predetermined color distances, and the like to generate a palette of colors.

However, mathematical algorithms may not account for trends in taste and human color preferences. Individuals can also create color palettes. The resulting color palettes may be different than the formulaic or predictable palettes that are generated automatically, yet visually appealing at least to the individual that created it. These color palettes may be ones that would generally not be created by a mathematical algorithm (e.g., a color palette that includes seemingly clashing colors).

Individuals, however, may be unable to account for trends in color combinations, identify or recreate popular color combinations, or the like, making it difficult to generate a color palette meeting their needs. In addition, it may be costly (e.g., time intensive) to create color palettes without the assistance of other people or systems.

Accordingly, the present disclosure provides systems and methods which generate color combinations that have been determined to be visually appealing or preferable by a community of people.

Aspects of the present disclosure leverage one or more data stores of color palettes that have been rated, ranked, and/or voted on by a community of people to indicate which color combinations are preferred by that community. Using an initial color or colors, an ordered list of affiliated colors can be generated where each affiliated color is ranked based at least in part on the popularity of the combination of the initial color or colors with that affiliated color. The color palette can be built by adding an affiliated color to the colors in the palette and then updating the list of affiliated colors to suggest new affiliated colors to add to the updated palette. The resulting color palette can be configured to contain a combination of colors that is visually appealing or preferable because each affiliated color used in generating the color palette has been determined by the community of people to be an appropriate or preferable color companion to the color or colors already in the palette.

In some embodiments, a first color can be selected by a program implemented by a computing device, or a user; and a plurality of palettes can be identified from a data store of palettes that contain the first color (or a sufficiently similar color). From those palettes, a list of affiliated colors can be generated by identifying the other colors in the palettes. For each affiliated color in the list, a weight can be assigned based on the ranking, rating, and/or number of votes the containing palette has received. The list of affiliated colors can be ordered based on the assigned weights. The program or user can select an affiliated color from the ordered or weighted list to add to a custom color palette containing the initial color. When the selected affiliated color is added to the palette, a new list of affiliated colors can be generated based at least in part on the colors in the palette. This allows the program or user to continue to build the color palette.

In some embodiments, two or more colors can be selected by a program or a user and a plurality of palettes can be identified from a data store of palettes that contain one or more of those colors (or sufficiently similar colors). A list of affiliated colors can be generated that includes a weight factor for each color, the weight factor based on the ranking, rating, and/or number of votes the containing palette has received. In certain implementations, the weight factor can be adjusted based on the relative popularity, rating, and/or ranking of the initial two or more colors. This may be accomplished, for example and without limitation, by decreasing the weight of colors affiliated with a relatively popular color and/or increasing the weight of colors affiliated with a relatively unpopular color or vice versa. From the weighted list of affiliated colors, the program (as implemented by a computing device) or user can select a color to add to the palette containing the initial two or more colors. When the selected affiliated color is added to the palette, a new list of affiliated colors can be generated based at least in part on the two or more initial colors, along with the new color added to the palette that allows the program or user to continue to build the color palette.

Overview of an Example Embodiment of an Affiliated Color Service

Turning now to FIG. 1, the figure illustrates a block diagram of an example operating environment 100 that includes an affiliated color service 102 to generate a color palette based at least in part on an input color or colors. In some embodiments, the operating environment 100 includes the affiliated color service 102, a palette data store 110, a network 120, color palette providers 130, and third party consumers 140. In some embodiments, various components of the operating environment 100 are communicatively interconnected with one another via the network 120. The operating environment 100 may include different components, additional components, fewer components, or can be structured differently. For example, there can be more than one data stores or other computing devices in connection with the affiliated color service 102. As another example, components of the operating environment 100 may communicate with one another with or without the network 120.

The affiliated color service 102 can correspond to any system capable of performing the processes described herein. The affiliated color service 102 may be implemented by one or more computing devices. For example, the affiliated color service 102 may be implemented by computing devices that include one or more processors to execute one or more instructions stored in memory, and communication devices to transmit and receive data over the network 120. In some embodiments, the affiliated color service 102 is implemented on one or more backend servers capable of communicating over a network. In certain embodiments, the affiliated color service 102 is implemented by one or more virtual machines in a hosted computing environment. The hosted computing environment may include one or more provisioned and released computing resources, which computing resources may include computing, networking or storage devices.

In some aspects, the affiliated color service 102 can implement one or more applications that perform, individually or in combination, functions described herein, including determining affiliated colors, assigning weights to affiliated colors, normalizing weights of affiliated colors, clustering or combining colors based on color distances, determining color similarity thresholds, updating affiliated colors based at least in part on updated palettes, etc. In certain aspects, the affiliated color service 102 may be configured to store or update palettes at the palette data store 110. In some embodiments, the affiliated color service 102 is associated with a network or network-based merchandise provider or vendor.

In the illustrated embodiment, the affiliated color service 102 is communicatively connected to the palette data store 110. The palette data store 110 can generally include any repository, data store, or information storage system that can store palette data and associated metadata. The palette data stored in the palette data store 110 can include collections of colors generated by a user and/or system based at least in part on human color preferences. Palette data can be stored in various formats, such as lists, groups, vectors, arrays, matrices, etc. Metadata can be associated with individual palettes and/or colors, for purposes of indicating their name, format, semantics, features, conditions, or the like.

The network 120 may include any suitable combination of networking hardware and protocols necessary to establish communications within the operating environment 100. For example, the network 120 may include private networks such as local area networks (LANs) or wide area networks (WANs) as well as public or private wired or wireless networks, satellite networks, cable networks, cellular networks, the Internet, or any combination thereof. In such embodiments, the network 120 may include hardware (e.g., modems, routers, switches, load balancers, proxy servers, etc.) implemented by hardware, and/or software (e.g., protocol stacks, accounting software, firewall/security software, etc.) implemented by hardware that establish networking links within the operating environment 100. Additionally, the network 120 may implement one of various communication protocols for transmitting data between components of the operating environment 100.

The color palette providers 130 may correspond to hosts of data stores of color palettes, the color palettes being ranked, rated, and/or voted on by a community of people associated with the color palette providers 130. The various hosts can include, for example and without limitation, hosts of an artistic network site, commerce network site, merchandise providers or vendors, designers, photographers, artists, social network sites, or the like. In some embodiments, the various color palette providers 130 are associated with a particular community of people such as artists, designers, photographers, cinematographers, fashion experts, critics, or the like. In certain embodiments, the color palette providers 130 are accessible by the public in general such that the associated color palettes are ranked, rated, or voted on by people that do not necessarily belong to any particular community or group. Examples of color palette providers 130 include Adobe Systems Incorporated's KULER® color services, Creative Market Lab, Inc.'s COLOURLOVERS™ color services, and the like.

The color palette providers 130 can create and/or curate color combinations based on the preferences of each provider's community of users. Particular color palette providers 130 may be associated with a particular community that includes a biased population or a population with unique or particular preferences. This may allow for the affiliated color service 102 to retrieve palettes with a known and/or desired bias depending at least in part on the use of the retrieved palettes. This may also allow for the affiliated color service 102 to reduce or remove the bias present in different communities by combining palettes from a plurality of communities of users.

The color palette providers 130 can be associated with any computing device(s) that can facilitate communication with the affiliated color service 102 via the network 120. Such computing devices can generally include network servers, desktops, laptops, wireless mobile devices (e.g., smart phones, PDAs, tablets, or the like), game platforms or consoles, electronic book readers, television set-top boxes, televisions (e.g., internet TVs), and computerized appliances, to name a few. Further, such computing devices can implement any type of software (such as a network server) that can facilitate the communications described above.

Similarly, third party consumers 140 may correspond to visitors to a commerce network site, designers, architects, or the like, and can be associated with any computing device(s) that can facilitate communication with the image processing service 102 via the network 120. Such computing devices can generally include wireless mobile devices (e.g., smart phones, PDAs, tablets, or the like), servers, desktops, laptops, game platforms or consoles, electronic book readers, television set-top boxes, televisions (e.g., internet TVs), and computerized appliances, to name a few. Further, such computing devices can implement any type of software (such as a browser or a mobile media application) that can facilitate the communications described above. The third party consumers 140 can include people utilizing the affiliated color service 102 to generate color palettes.

One skilled in the relevant art will appreciate that the components and configurations provided in FIG. 1 are illustrative in nature. Accordingly, additional or alternative components and/or configurations, including the additional components, systems and subsystems for facilitating functions disclosed herein may be utilized.

Figure 2:
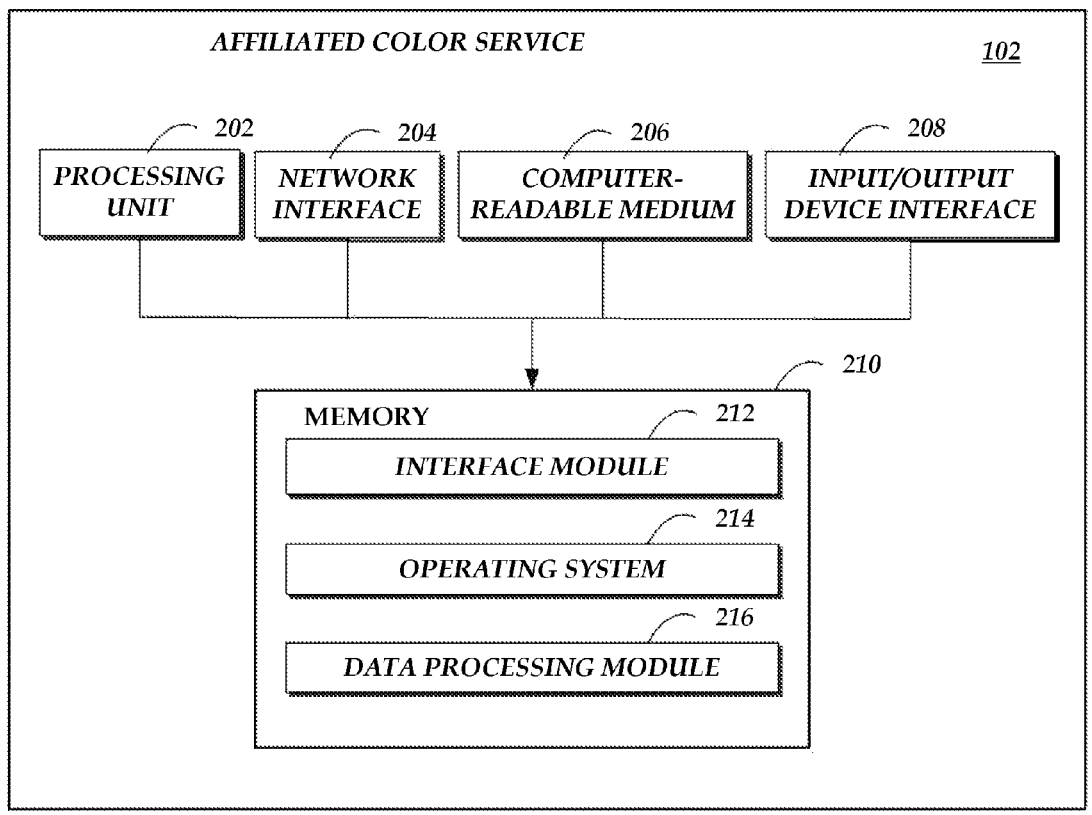
FIG. 2 illustrates a block diagram of example components of an affiliated color service utilized in accordance with the operating environment of FIG. 1.

FIG. 2 illustrates a block diagram of example components of an affiliated color service 102 utilized in accordance with the operating environment 100 of FIG. 1. The affiliated color service 102 includes an arrangement of computer hardware and/or software components that may be used to implement aspects of the present disclosure. Those skilled in the art will appreciate that the affiliated color service 102 may include different components (e.g., more or fewer components) than those depicted in FIG. 2. Those skilled in the art will also appreciate that not all of these generally conventional components have been shown but are understood to be present to enable the functionality and processes described herein.

In the illustrated embodiment, the affiliated color service 102 includes a processing unit 202, a network interface 204, a non-transitory computer-readable medium 206, and an input/output device interface 208, all of which may communicate with one another by way of a communication bus. The network interface 204 may provide the affiliated color service 102 with connectivity to one or more networks or computing systems. The processing unit 202 may thus receive information and instructions from other computing devices, systems, or services via a network. The processing unit 202 may also communicate to and from memory 210 and further provide output information via the input/output device interface 208. The input/output device interface 208 may also accept input from various input devices, such as a keyboard, mouse, digital pen, touch screen, etc.

The memory 210 may contain computer program instructions that the processing unit 202 may execute in order to implement one or more processes described herein. The memory 210 generally includes RAM, ROM, and/or other persistent or non-transitory computer-readable storage media. The memory 210 may store an operating system 214 that provides computer program instructions for use by the processing unit 202 in the general administration and operation of the affiliated color service 102. The memory 210 may further include other information for implementing aspects of the present disclosure.

In some embodiments, the memory 210 includes an interface module 212. The interface module 212 can be configured to facilitate generating one or more user interfaces through which a third party consumer 140, utilizing a compatible computing device, may interact with the affiliated color service 102 to access affiliated colors, generate or modify a color palette, etc. Specifically, the interface module 212 can be configured to facilitate color palette generation functions described herein, including generating a list or grouping of affiliated colors, weighting affiliated colors, updating affiliated color lists upon updates to input color or colors, ranking and/or ordering the affiliated colors, combining colors based at least in part on color distance, etc. For example, a third party consumer 140 may provide an initial color or colors around which a color palette may be built. This can be done via one or more generated user interfaces. The user interface can be implemented as a graphical user interface (GUI), network-based user interface, computer program, smartphone or tablet program or application, touchscreen, command line interface, gesture, voice, or text interface, etc., or any combination thereof. Furthermore, the user interfaces can display an ordered and/or weighted list of affiliated colors, the current colors selected and/or included in the palette being generated, and the like.

In addition, the memory 210 may include a data processing module 216 that may be executed by the processing unit 202. In some embodiments, the data processing module 216 implements aspects of the present disclosure. For example, the data processing module 216 can be configured to process color data, instructions, or metadata. Specifically, the data processing module 216 can be configured to perform affiliated color functions described herein, including identifying affiliated colors, weighting affiliated colors, clustering or combining colors, etc. The color data processed by data processing module 216 can be of various formats. For example, color can be represented by a vector based on a primary color model (e.g., RGB) or a luminance-chrominance model (e.g., Y'UV, YUV, YCbCr, or YPbPr).

It should be noted that the affiliated color service 102 may include some or all of the components present in the affiliated color service 102 as discussed herein with respect to FIG. 2. In addition, the affiliated color service 102 may include additional components not present in FIG. 2. The modules or components described above may also include additional modules or be implemented by computing devices that may not be depicted in FIG. 1. For example, although the interface module 212 and the data processing module 216 are identified in FIG. 2 as single modules, one skilled in the relevant art will appreciate that each of the modules may be implemented by two or more modules and in a distributed manner. As another example, the affiliated color service 102 and its components can be implemented by network servers, application servers, data store servers, combinations of the same, or the like, configured to facilitate data transmission to and from color palette providers 130 or third party consumers 140 via network 120. Accordingly, the depictions of the modules are illustrative in nature.

Example Process to Generate a List of Affiliated Colors

Figure 3:
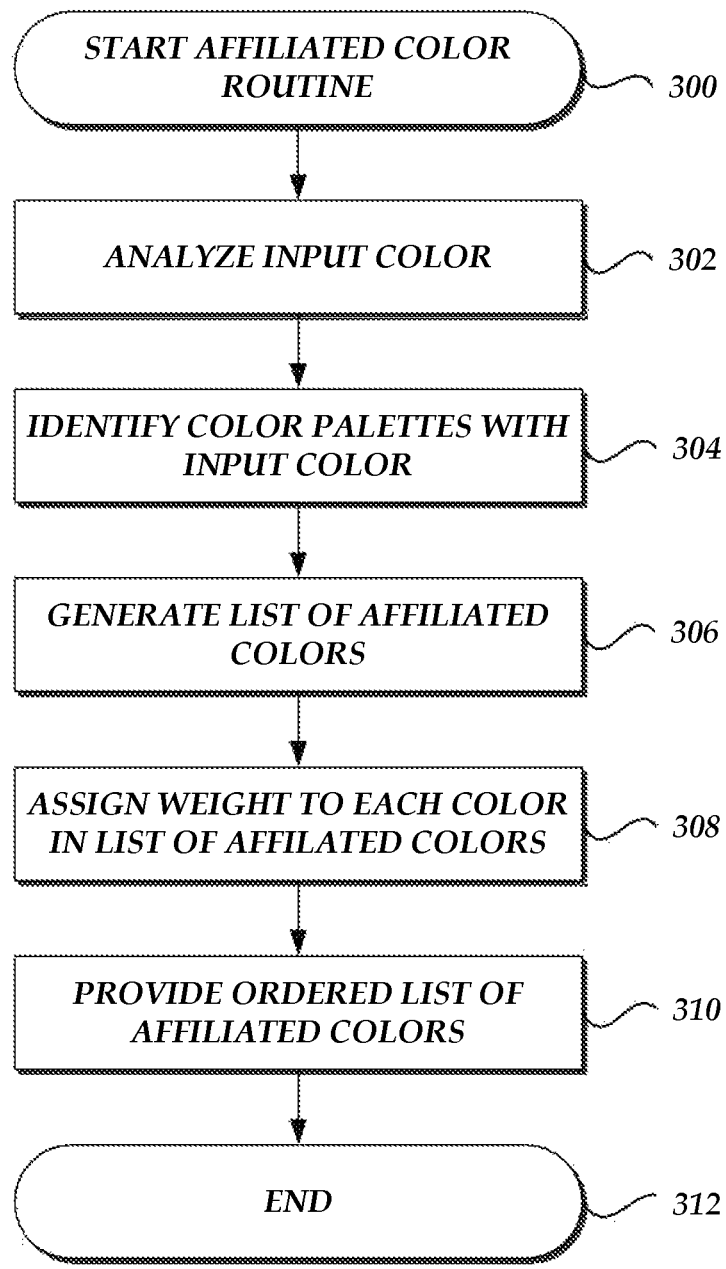
FIG. 3 illustrates a flow diagram of an example routine for generating an ordered list of affiliated colors, the routine implemented by an affiliated color service such as that shown in FIG. 1.

FIG. 3 illustrates a flow diagram of an example routine 300 for generating a weighted or ordered list or grouping of affiliated colors, the routine implemented by an affiliated color service 102. Routine 300 begins at block 302, where the affiliated color service 102 analyzes an input color. The input color can be received from a user (e.g., a third party consumer 140 via data transmission to the affiliated color service 102), from another system, or generated randomly. In some embodiments, the input color can be extracted from an image, such as an image provided by a user or an image of a product in a product catalog or on a network site. Various systems and methods for extracting colors from an image are described in U.S. patent application Ser. No. 14/316,483, entitled "IMAGE-BASED COLOR PALETTE GENERATION," filed Jun. 26, 2014, which is incorporated by reference herein in its entirety.

In some embodiments, the input color is determined based at least in part on preferences, behavior, or properties of a user. A system can analyze properties of the user and determine one or more colors that the user is likely to prefer. For example, the affiliated color service 102, or other system, may have access to a user profile, which includes, for example and without limitation, media preferences (e.g., preferred movies, TV shows, books, music, etc.), purchase history (e.g., products purchased in an electronic marketplace), demographics (e.g., age, gender, nationality, etc.), geographical location (e.g., where the user resides and/or previously resided), product preferences (e.g., through the use of wish lists), and the like. The affiliated color service 102 can analyze such information and determine probable colors that the user would like. One or more of these colors determined by the affiliated color service 102 can be used as the input color. As another example, the affiliated color service 102, or other system, can compare users to determine an input color. For a particular user, the affiliated color service 102 can analyze the color preferences of similar users (e.g., where similarity of users can be based at least in part on purchase history, media preferences, demographics, etc.) to determine one or more input colors that the particular user would prefer. This can be done by identifying another user with similar preferences and/or by aggregating user profile information to identify color preferences for an average user with similar preferences.

In block 302, analyzing the input color image can include determining the components of the color, such as the primary color values (e.g., RGB values), the luminance-chrominance values (e.g., YUV or YCbCr values), or the like. Analyzing the input color image can also include determining a threshold within which a color will be considered to be the same as, or sufficiently similar to, the input color. The threshold can be based on color distance according to a color distance formula. An example of such a formula is based on a human perceptible color difference. Various methods and systems for determining a human perceptible color difference using a human color distance formula are described in U.S. patent application Ser. No. 14/316,483, entitled "IMAGE-BASED COLOR PALETTE GENERATION," filed Jun. 26, 2014; U.S. patent application Ser. No. 14/316,530, entitled "IMAGE-BASED COLOR PALETTE GENERATION," filed Jun. 26, 2014; U.S. patent application Ser. No. 14/316,528, entitled "IMAGE-BASED COLOR PALETTE GENERATION," filed Jun. 26, 2014; and U.S. patent application Ser. No. 14/316,549, entitled "IMAGE-BASED COLOR PALETTE GENERATION," filed Jun. 26, 2014, each of which is incorporated by reference herein in its entirety.

At block 304, the affiliated color service 102 identifies a plurality of color palettes that include the input color. The color palettes can be provided by the color palette providers 130. In some embodiments, one or more color palettes can be provided by the palette data store 110 where the palettes stored therein have been voted on, ranked, and/or rated. In some embodiments, the plurality of color palettes can be provided by the third party consumers 140.

The affiliated color service 102 determines that a palette contains the input color when that palette has at least one color that falls within the threshold color distance from the input color, as determined at block 302. In this way, palettes including colors not identical to the input color, but that include colors sufficiently close to the input color, are included in the list of palettes identified at block 304. In some embodiments, the affiliated color service 102 can use a fast color indexing routine to pull colors from the palettes, as described in U.S. patent application Ser. No. 14/315,700, entitled "FAST COLOR SEARCHING," filed Jun. 26, 2014, which is incorporated by reference herein in its entirety.

At block 306, the affiliated color service 102 generates a list or grouping of affiliated colors. The list of affiliated colors comprises the colors from the list of palettes identified at block 304, excluding the input color and those colors that are sufficiently close to the input color. In some embodiments, the list of affiliated colors can include all the colors from the list of palettes. In certain embodiments, the list of affiliated colors is concatenated based at least in part on a threshold number of colors to include in the list, a desired or targeted color variety, color exclusion rules, or the like.

At block 308, the affiliated color service 102 assigns weights to each color in the list of affiliated colors. The affiliated color service 102 loops through each color in the list, identifies from which palette the color originated, and adjusts a weight of the color based at least in part on the ranking, rating, and/or number of votes associated with the originating palette. Adjusting the weight of the color can include increasing the weight factor by a number of votes or average rating of the originating palette. In some embodiments, adjusting the weight of the color includes scaling the ranking, rating, and/or number of votes based at least in part on a number of factors that can include which users voted on the palette, the age of the palette, the number of comments on the palette, the geographical location of the users who voted, and the like. In some embodiments, the ranking, rating, and/or voting of a palette is distributed among the colors within a particular palette based at least in part on color popularity, ranking of colors within a palette, or the like. In certain embodiments, each color in a palette has an individual ranking, rating, and/or number of votes where the rating can be associated with the rating of the palette or independent from the rating of the palette.

Where a color appears in more than one palette, the weight of that color can be determined at least in part by aggregating the weights from each originating palette. One aggregation method is to add the weights of each originating palette. As an example of a simple case, where a color appears in 3 palettes, the weight of that color can be equal to the sum of the votes of each of the 3 palettes. It is to be understood that other weight aggregation schemes can be used without departing from the scope of this disclosure. For example, weights can be aggregated using a weighted average of votes, an arithmetic mean of votes, or using some other algorithm (where votes can be the number of votes for a palette, the average rating of a palette, or the ranking of a palette, for example). Weight aggregation can also be configured to account for rating of a palette or color as a function of time and/or geographical location.

The affiliated color service 102 can use a similar color distance threshold when aggregating weights for an affiliated color. For example, a color distance threshold can be used such that when the affiliated color service 102 is determining a weight for an affiliated color, it aggregates the votes from the palettes containing that affiliated color and the palettes that contain a color with a distance from the affiliated color that is less than or equal to the color distance threshold. The color distance threshold used in analyzing the input color at block 302 and the color distance threshold used in weighting affiliated colors at block 308 can be the same or different, and may be based on the same or different color distance algorithms.

At block 310, the affiliated color service 102 tallies the weights of each color and provides a weighted, ordered, and/or ranked list or grouping of affiliated colors, where the rank of an affiliated color is based at least in part on the relative weight of the color. The affiliated color service 102 can concatenate the ordered list of affiliated colors based at least in part on a desired or targeted number of colors to include in the list, a threshold weight factor to include in the list, a variety of colors in the list, color exclusion rules, or the like. Routine 300 ends at block 312.

Figure 4:
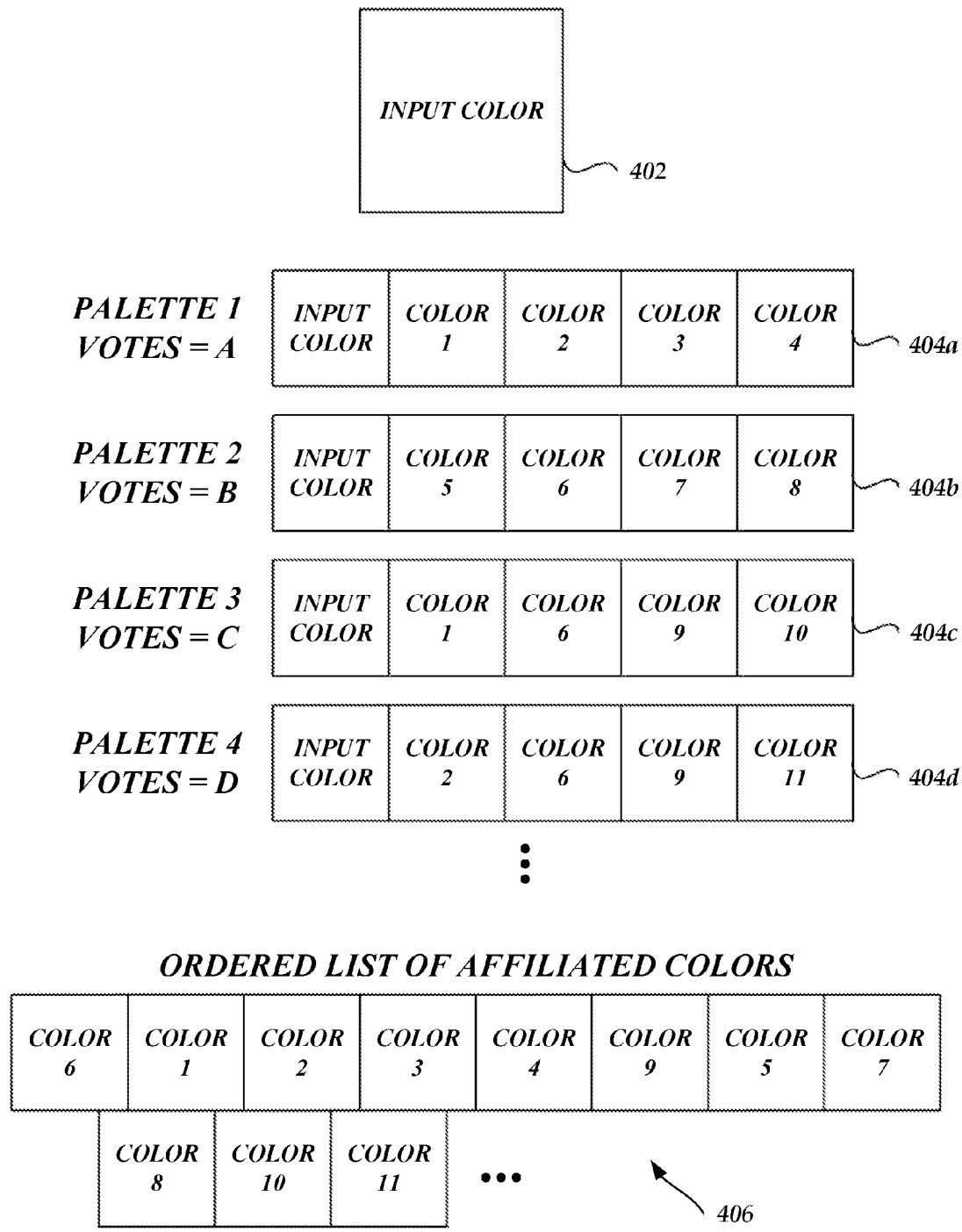
FIG. 4 illustrates an example ordered list of affiliated colors generated by the example routine of FIG. 3.

FIG. 4 illustrates an example list of affiliated colors 400 generated by the example routine 300 of FIG. 3. Starting with the input color 402, the affiliated color service 102 identifies a number of palettes 404a-404d, each of which includes the input color or a color sufficiently similar to the input color (e.g., where the color distance between the color in the palette and the input color is less than a color distance threshold). The palettes 404a-404d can be from a data store of human- or machine-created color palettes, but which have been voted on, ranked, or rated by a community of users. As used herein, the terms votes, rating, and/or ranking are used to indicate that there is a value associated with the palette where the value is indicative of a level of human preference for the palette. Where only a single term is used (e.g., only vote, ranking, or rating), it is to be understood that the other terms could also be used. The rating of a color palette can be based on a number of votes, such as where a palette's score can be incremented by a value according to a positive vote by a user, or similarly decremented by a value according to a negative vote by a user. Similarly, the rating of a color palette can be based on a rating system where users can rate palettes on a rating scale (e.g., 0 to 5, 1 to 5, 0 to 10, −5 to 5, etc.). Likewise, the rating of a color palette can be based on users ranking palettes relative to one another.

Each time a palette is identified that contains the input color, or a color sufficiently close to the input color, each of the other colors in the palette is added to a list of affiliated colors. Each of the colors on the list of affiliated colors receives a weight that corresponds to the rating of the originating palette. For example, each of colors 1-4 in palette 1 404a is assigned a weight corresponding to the number of votes for palette 1 404a, represented by the variable A. Likewise, each of the colors in palettes 2-4 404b-404d is assigned a weight corresponding to the number of votes for each palette, represented by the variables B-D.

If a color is found in more than one palette, the weight of the color is adjusted based on the rating of each of the originating palettes. For example, color 1 is found in palette 1 and palette 3, so the weight of color 1 is based on the number of votes A+C. In some embodiments, an affiliated color is considered to be found on another palette (e.g., other than its originating palette) when the color in the other palette has a color distance that is less than a color distance threshold from the affiliated color. In some embodiments, the weighting of colors is analyzed as a function of position in a color space where the distribution of weighted colors is analyzed to determine maximums. This may provide additional details about which colors are generally considered to go well with the input color, which may in turn result in the ability to provide multiple suggestions of colors within and/or around a peak color in the color space.

In some embodiments, the list of affiliated colors is adjusted to combine colors that are close to one another based at least in part on a color distance formula. This aspect can be used to decrease the number of different colors where some colors are sufficiently similar to one another, thus reducing the number of variations of a color, especially where the variations are insignificant, imperceptible, or otherwise lacking in value to a user.

Once the weight of each affiliated color is determined, a weighted or ordered list of affiliated colors 406 can be provided. The ordered list can include all the different colors from the palettes 404a-404d or it can contain a subset of these colors. The ordering of the list can be based at least in part on the weight of each color (e.g., higher weighted colors are ranked higher). As illustrated in the figure, the colors 1-11 are ranked according to the sum of the votes for each color, where A is greater than B, which is greater than C, which is greater than D. Accordingly, using an aggregation scheme based on the sum of weights, color 6 has a weight of B+C+D, color 1 has a weight of A+C, color 2 has a weight of A+D, etc.

In some embodiments, the ratings of the palettes are time-dependent. The affiliated color service 102 can use the time-dependent ratings to identify trends in color combinations and/or to identify color combinations that are relatively stable over time (e.g., classic color combinations). This can also be used to determine color combinations that were popular at a particular time.

Time-dependent ratings can also be used to predict color trends in the future. For example, the most popular colors can be tracked as a function of time, with the result plotted in a color space. The path through the color space of the most popular color (e.g., the color that is the most popular color at a point in time) can be used to project what the most popular color will be at some point in the future. For example, the affiliated color service 102 can determine a directional shift of the most popular color within the color space as a function of time and project based on the directional shift. The affiliated color service 102 can then provide suggestions of color combinations based on projections of which colors will be popular at a point in time. This may be useful, for example, for visual artists to predict trends in colors and/or color combinations. It is to be understood that this projection technique can be used for the most popular color as well as the second most popular, third most popular, etc. It is also to be understood that this projection technique can be used for color palettes as well as individual colors.

In some embodiments, geographical information can be included with the ratings of the palettes (e.g., ratings of a palette can be provided as a function of location of the voting user). The affiliated color service 102 can use the geography-associated ratings to identify color combinations that are generally associated with a geographical location. For example, users within a geographical region may prefer a color combination associated with a sports team from the geographical region. The affiliated color service 102 can use information about the user (e.g., where the user is located) to suggest color combinations that utilize the geography-associated ratings of palettes.

Example Affiliated Color Palette Generation Process

Figure 5:
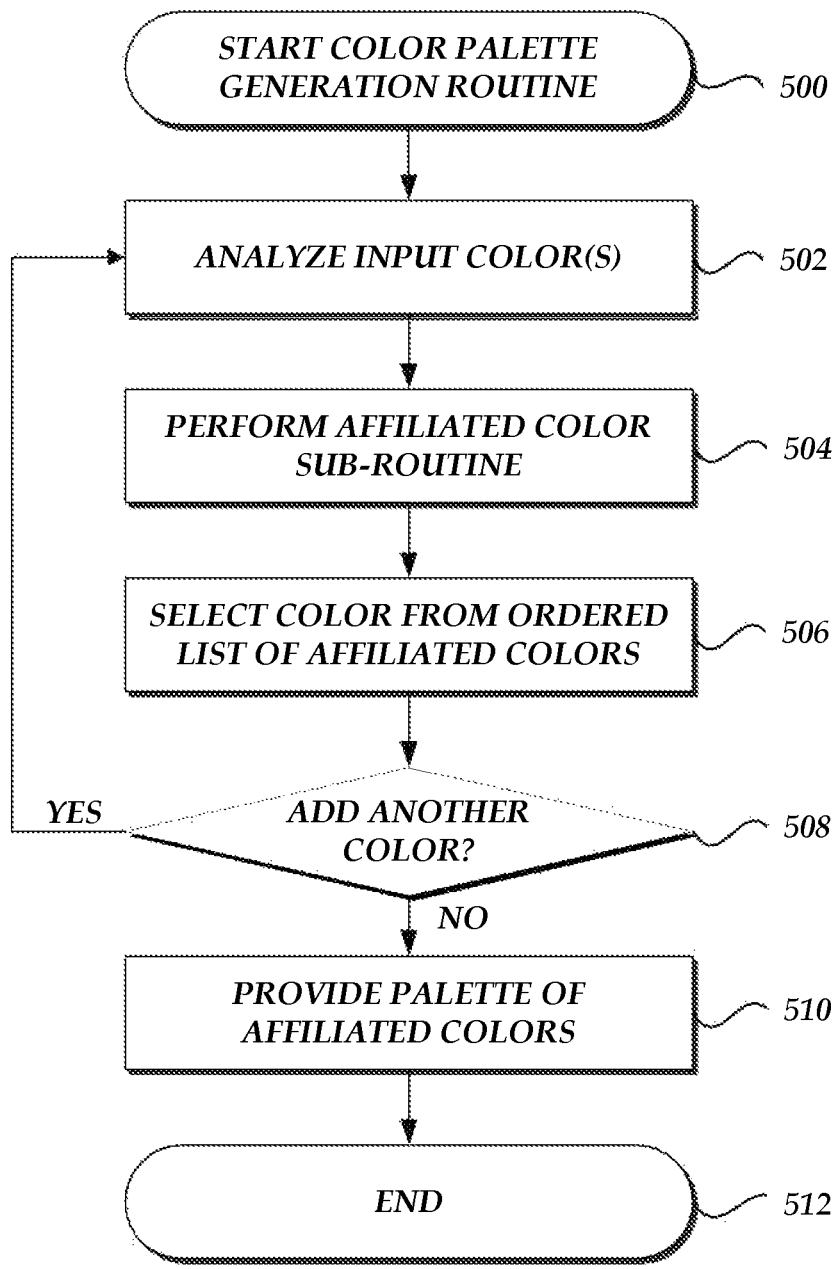
FIG. 5 illustrates a flow diagram of an example affiliated color palette generation routine implemented by an affiliated color service such as that shown in FIG. 1.

FIG. 5 illustrates a flow diagram of an example affiliated color palette generation routine 500 implemented by an affiliated color service 102. Routine 500 begins at block 502, where the affiliated color service 102 analyzes an input color or colors. The input color or colors can be received as described above with respect to block 302 of routine 300, illustrated in FIG. 3. Analysis of the input color or colors can include the functions described herein with reference to block 302 in FIG. 3. Returning to FIG. 5, in some embodiments, the routine 500 can accept a plurality of input colors in determining a color palette, a particular example of which is described with reference to FIGS. 9 and 10. In such a case, analyzing the input colors can include repeating, for each input color, the element of analyzing the input color as described with reference to block 302 in FIG. 3.

With reference to FIG. 5, at block 504, the affiliated color service 102 performs routine 300, described herein with reference to FIG. 3. In some embodiments, the affiliated color service can move to block 304 upon entering the routine 300 because the input color or colors has been analyzed in block 502. As described, the output of routine 300 is a weighted or ordered list or grouping of affiliated colors. The routine 300 can be modified to provide the ordered list of affiliated colors where there is a plurality of input colors. For example, the affiliated color service 102 can identify palettes that include one or more of the plurality of affiliated colors. In some embodiments, the affiliated color service 102 identifies palettes which include all of the input colors. In some embodiments, the affiliated color service 102 identifies palettes that include at least one of the input colors. Once the palettes are identified, the weighting of the list of affiliated colors can proceed much the same way as described herein. In some embodiments, the weighting scheme of the affiliated colors is modified based on the input colors. For example, the popularity of each of the input colors can be used to normalize or scale the weighting factors of palettes of the respective input colors.

At block 506, the affiliated color service 102 selects a color from the ordered list of affiliated colors. The selection can be based on user input through a user interface. For example, routine 500 can be interactive such that a user provides the affiliated service 102 with the input color(s) and is provided the ordered list of affiliated colors generated at block 504. The user can then select a color from the ordered list and indicate the selection to the affiliated color service 102. In some embodiments, the affiliated color service 102 selects a color from the ordered list of affiliated colors. The selection can be based at least in part on any one or more of the weighting of the affiliated color, the color distance of the affiliated color from the input color and/or other affiliated colors on the list, a selection criteria determined by a user or other system, or the like. Selection of the color from the ordered list of affiliated colors adds that color to the palette which includes the input color(s). In some embodiments, a plurality of colors can be selected.

In some embodiments, the affiliated color service 102 can select two or more colors from the ordered list of affiliated colors and provide a projection of what palettes would look like based on the selected colors. For example, the affiliated color service 102 can select the two most popular colors from the ordered list of affiliated colors (e.g., the two colors with the highest weight) and create a first tentative color palette that contains the input color(s) and the first popular color, and a second tentative color palette with the input color(s) and the second popular color. The affiliated color service 102 can then provide a weighted or ordered list of affiliated colors for each of the two tentative color palettes. This can be accomplished, for example, through the routine 300 described herein with reference to FIG. 3. In addition, this can advantageously be used to show a direction a color palette may go based on selection of a particular color for a color palette. In certain embodiments, the affiliated color service 102 can select the two or more colors based on user input, input from another system, random selection, or any combination thereof.

In various embodiments, the affiliated color service 102 can recursively provide tentative color palettes to provide a variety of tentative color palettes. For example, for the two tentative color palettes described above, the affiliated color service 102 can select the two most popular colors from the ordered list of affiliated colors associated with each tentative color palette to generate a second level of tentative color palettes. This process can continue a number of times to provide the variety of tentative palettes. The affiliated color service 102 can select a different number of colors in each iteration of this routine and for each tentative palette. The affiliated color service 102 can select the two or more colors based on criteria which include, for example and without limitation, color popularity, color variety, exclusion rules, color distance, or any combination thereof.

At block 508, the affiliated color service 102 determines whether another color will be added to the palette. If another color is to be added, routine 500 returns to block 502 to analyze the input colors, which now includes the color selected in block 506.

If the palette is finished (e.g., no other colors are to be added to the palette), routine 500 proceeds to block 510 where the affiliated color service 102 provides the palette of affiliated colors. As illustrated in FIG. 1, the provided palette of affiliated colors can be stored in palette data store 110, sent to the third party consumers 140, and/or sent to the color palette providers 130. Routine 500 then ends at block 512.

Figure 6:
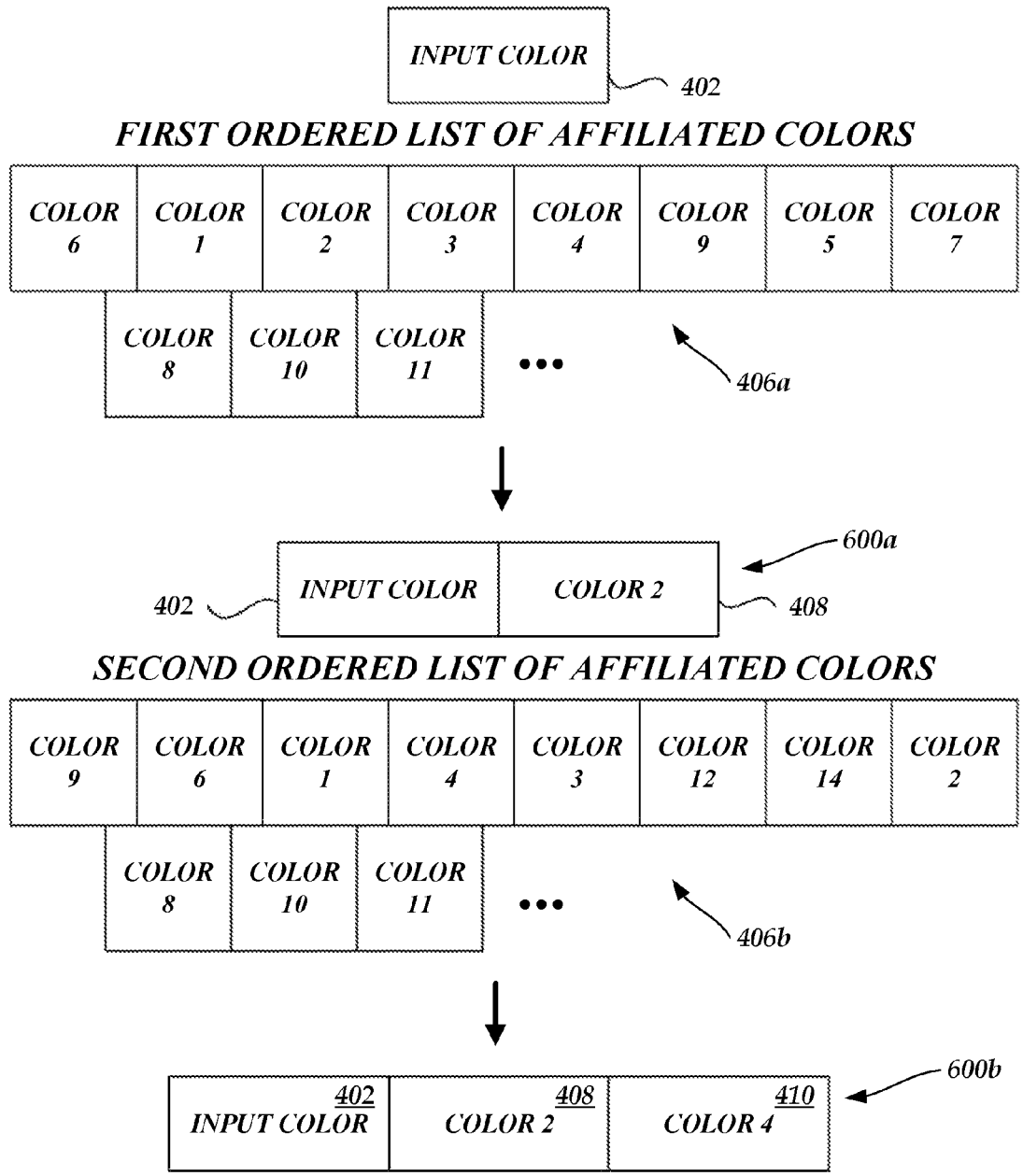
FIG. 6 illustrates example affiliated color palettes generated by the routine of FIG. 5.

FIG. 6 illustrates example affiliated color palettes 600a and 600b generated by the routine 500 of FIG. 5. Starting with an input color 402, a first ordered list of affiliated colors 406a is generated, as described with reference to FIG. 4. A color can be selected from the first ordered list of affiliated colors 406a. This results in a color palette 600a that includes the input color 402 and the selected color 408 (e.g., color 2 from the first ordered list of affiliated colors). The new color palette 600a can then be used to generate a second ordered list of affiliated colors that now includes colors associated with the input color 402 and the selected color 408. Because new and/or different palettes have been included in the routine to determine the ordered list of affiliated colors, the order of the affiliated colors may change. In addition, the second affiliated color list 406b may include colors not present in the first ordered list of affiliated colors 406a. This process can be repeated to build up a color palette with a plurality of colors, such as color palette 600b.

In some embodiments, as the number of input colors increases, the number of affiliated colors decreases. The affiliated color service 102, for example, may limit the identified palettes to those which include all of the input colors or a majority of the input colors. This may desirable to reduce the number of potential colors in the affiliated color list that may result in visually unappealing color combinations. In this way, the palette generation is self-limiting as the more colors in the palette, the fewer affiliated colors that are presented.

By using the votes of a community of users, the generated color palettes represent a subjective color combination that may be different from what a mathematical formula may provide and which is generally preferable to users. Using human arbiters to generate color combinations can provide color palettes that mathematical algorithms may be incapable of fully determining.

The input color or colors can be determined or provided by a user, a computer system, or a combination of both. For example, a user may want to build an outfit that includes the color pink. Based on this input color, the affiliated color service 102 can provide an ordered list of affiliated colors which have been determined by a community of users to go well with the input color. As another example, a user can select the color pink as an input color and the affiliated color service 102 can be configured to select a one or more additional colors randomly or through another algorithm to provide a suggested color palette (or multiple color palettes). As another example, the user can pick a product (or a collection of products) and a color fingerprint (or a subset of it) can be used as the basis for determining affiliated colors. Various methods and systems for extracting a color fingerprint from an image of a product are described in U.S. patent application Ser. No. 14/316,483, entitled "IMAGE-BASED COLOR PALETTE GENERATION," filed Jun. 26, 2014, which is incorporated herein by reference in its entirety. Any of these color palettes could then be used to identify and/or filter potential products for the user.

Figure 7:
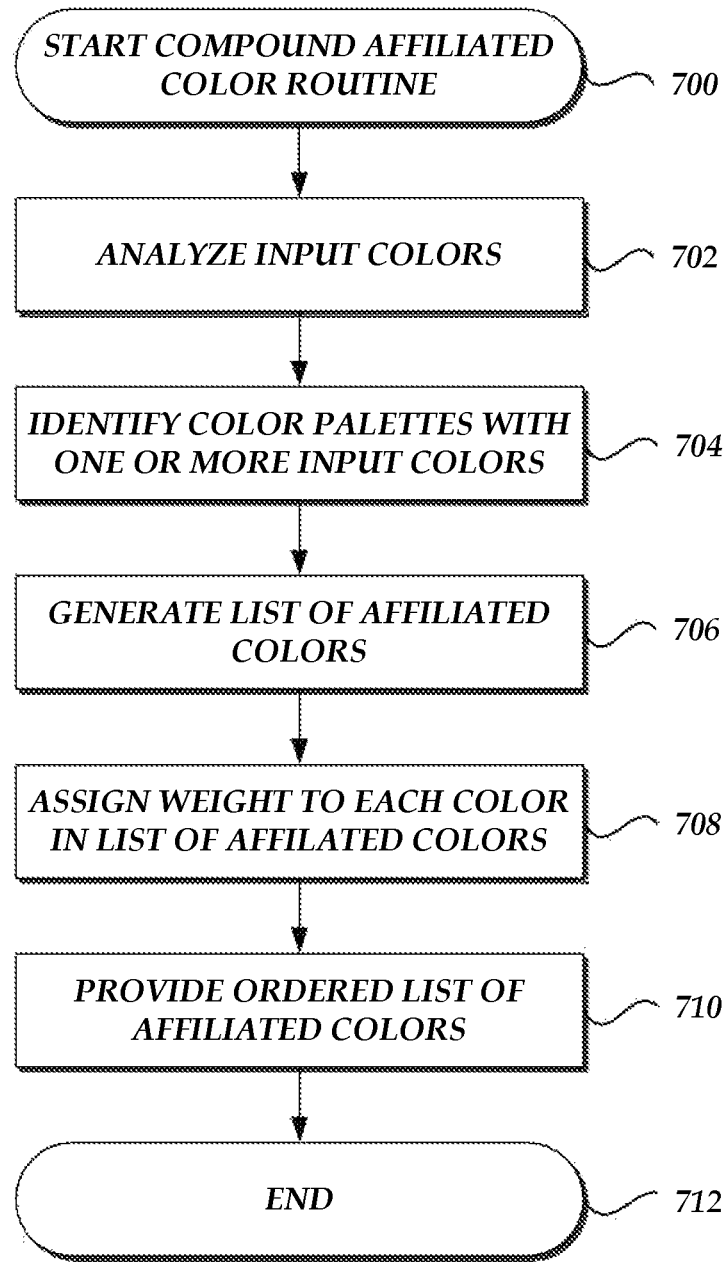
FIG. 7 illustrates a flow diagram of an example routine for generating an ordered list of affiliated colors from a plurality of initial colors, the routine implemented by an affiliated color service such as that shown in FIG. 1.

Example Process of Generating an Affiliated Color Palette Using Two or More Input Colors FIG. 7 illustrates a flow diagram of an example routine 700 for generating a list or grouping of affiliated colors from a plurality of initial colors, the routine implemented by an affiliated color service 102. Routine 700 begins at block 702, where the affiliated color service 102 analyzes two or more input colors. Similar to the routine 300 described with reference to FIG. 3, the input colors can be received from a user (e.g., a third party consumer 140 via data transmission to the affiliated color service 102), from another system (e.g., through analysis of a user profile), generated randomly, extracted from an image (e.g., see U.S. patent application Ser. No. 14/316,483, entitled "IMAGE-BASED COLOR PALETTE GENERATION," filed Jun. 26, 2014, which is incorporated by reference herein in its entirety), or a combination of these. Analyzing the two or more input colors can include determining a threshold within which a color will be considered sufficiently similar to the input color. The threshold can be the same or different for each of the two or more input colors. The threshold can be based at least in part on color distance, for example and without limitation, using a human perceptible color distance as described in more detail in U.S. patent application Ser. No. 14/316,483, entitled "IMAGE-BASED COLOR PALETTE GENERATION," filed Jun. 26, 2014, which is incorporated by reference herein in its entirety.

With reference to FIG. 7, at block 704, the affiliated color service 102 identifies a plurality of color palettes that include at least one of the two or more input colors. The color palettes can be provided, for example and without limitation, by the color palette providers 130, the palette data store 110, and/or the third party consumers 140. The affiliated color service 102 determines that a palette contains at least one of the input colors when the palette has at least one color that falls within the threshold color distance from at least one of the input colors, as determined at block 702. In some embodiments, the affiliated color service 102 can use a fast color indexing routine to pull colors from the palettes, as described in U.S. patent application Ser. No. 14/315,700, entitled "FAST COLOR SEARCHING," filed Jun. 26, 2014, which is incorporated by reference herein in its entirety.

At block 706, the affiliated color service 102 generates a list or grouping of affiliated colors. The list of affiliated colors comprises the colors from the list of palettes identified at block 704, excluding the two or more input colors and those colors that are sufficiently close to the two or more input colors. The list of affiliated colors can include all the colors from the list of palettes, a threshold (e.g., minimum or maximum) number of colors, a desired or targeted variety of colors, or the like. In some embodiments, the list of affiliated colors can be restricted to the colors that, for example and without limitation, appear in palettes containing a plurality of the input colors, all of the input colors, a majority of the input colors, or the like. As described with reference to FIG. 5, the affiliated color service 102 can recursively provide tentative color palettes to provide a variety of tentative color palettes where there is a plurality of input colors.

With reference to FIG. 7, at block 708, the affiliated color service 102 assigns a weight to each color in the list of affiliated colors. The affiliated color service 102 loops through each color in the list, identifies from which palette the color originated, and adjusts the weight of the color based at least in part on the ranking, rating, and/or number of votes associated with the originating palette. The weight assigned to a color can be further normalized to account for relative popularities of the two or more input colors.

The normalization procedure can include scaling the weight factors based on a percentage of total votes of all the palettes that contain a particular input color. For example, a normalization factor, N, can be defined to be a sum of all the weights, w, assigned to each palette:

$$N=\Sigma_{i=1}^{n} w_i$$

where the total number of terms in the sum, n, and the weight factor, $w_i$, can respectively be the total number of palettes and the weight factor of a particular palette, or the total number of colors and the weight factor of a particular color. The normalized weight factor for a particular color can then be $w_i/N$.

As a particular example, if a first input color is included in 10 palettes, and the total number of votes received for the 10 palettes is 250 votes, each color from a particular palette is assigned a weight factor equal to the number of votes for that palette, which is then normalized by dividing by 250. If a first affiliated color is included in a palette with 25 votes, the normalized weight factor for that color would be 0.1.

As another example, the normalization procedure can include normalization based at least in part on trending information. For example, the weight factor of an affiliated color can be increased or decreased if the popularity of the affiliated color has changed over time. If an affiliated color has experienced a recent increase in popularity, the weight factor can be increased (e.g., where it is desirable to emphasize current trends) or decreased (e.g., where it is desirable to reduce the influence of temporary trends). The normalization procedure can account for trending across all the affiliated colors produced in block 706. The procedure can be configured to either increase or decrease the effects of recent shifts in popularity, depending at least in part on the desired outcome and/or the targeted use or application of the affiliated colors.

As another example, the normalization procedure can include geographical factors to adjust the weight of a color. For example, the weight factor of an affiliated color can be increased if that color is popular in the same geographical region as a user building a color palette.

As another example, the normalization procedure can include multiplying weight factors for each affiliated color. As a particular example, if a first affiliated color has a weight factor of w1 with respect to a first input color and a weight factor of w2 with respect to a second input color, the normalized weight factor is w1*w2. This can be used to eliminate affiliated colors that are affiliated with only one input color or with less than all input colors (e.g., the weight factor of an affiliated color will be 0 where it is not associated with a particular input color, and thus the normalized weight factor will be 0). This normalization procedure can be used to assign higher normalized weights to colors that have a high rating with respect to at least one input color. This normalization procedure can be used to assign higher normalized weights to colors that have average ratings with respect to a plurality of input colors.

Where a color appears in more than one palette, the weight of that color can be the combination of the weights. The affiliated color service 102 can aggregate the weights before and/or after normalizing them. As described with reference to FIG. 3, weight aggregation can be accomplished through a variety of techniques including, for example and without limitation, summing the weights, utilizing a weighted average technique, determining an arithmetic mean of weights, or the like. The affiliated color service 102 can use a color distance threshold when aggregating weights for an affiliated color, such as the technique described above with reference to block 702. The color distance threshold and/or algorithm can differ between the input colors and/or the affiliated colors.

With reference to FIG. 7, at block 710, the affiliated color service 102 tallies the normalized weights of each color and provides an ordered or ranked list or grouping of affiliated colors, where the rank of an affiliated color is based at least in part on the relative normalized weight of the color. The affiliated color service 102 can concatenate the ordered list of affiliated colors based at least in part on a desired or targeted number of affiliated colors to include in the list, a threshold weight factor to include in the list, a variety of affiliated colors in the list, or the like. Routine 700 ends at block 712.

Figure 8:
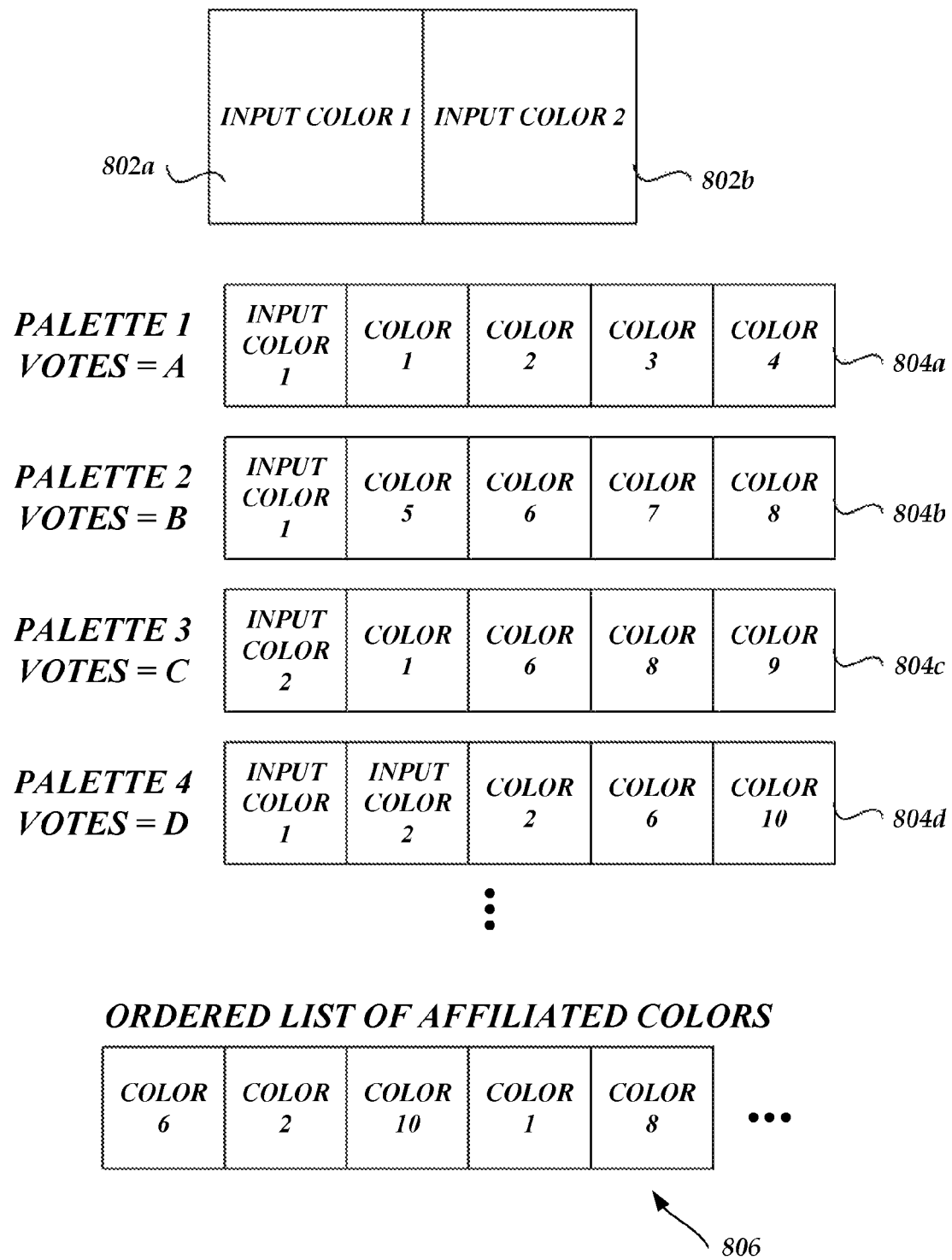
FIG. 8 illustrates an example ordered list of affiliated colors generated by the example routine of FIG. 7.

FIG. 8 illustrates an example list of affiliated colors 806 generated by the example routine 700 of FIG. 7. Starting with input color 1 802a and input color 2 802b, the affiliated color service 102 identifies a number of palettes 804a-804d, each of which includes at least one of the two input colors or a color sufficiently similar to at least one of the input colors (e.g., where the color distance between the color in the palette and at least one of the input color is less than a color distance threshold). The palettes 804a-804d can be from a data store of human- or machine-created color palettes that have been voted on, ranked, or rated by a community of users.

Each time a palette is identified that contains at least one of the input colors, or a color sufficiently close to at least one of the input colors, each of the other colors in the palette is added to a list of affiliated colors. Each of the colors on the list of affiliated colors receives a weight that corresponds to the rating of the originating palette. For example, each of colors 1-4 in palette 1 804a is assigned a weight corresponding to the number of votes for palette 1 804a, represented by the variable A. Likewise, each of the colors in palettes 2-4 804b-804d is assigned a weight corresponding to the number of votes for each palette, represented by the variables B-D.

In some embodiments, a list of affiliated colors is associated with an input color. For example, a first list of affiliated colors can be generated for input color 1 802a and a second list of affiliated colors can be generated for input color 2 802b, where the lists of affiliated colors are generated according to the methods described herein. In the example illustrated in FIG. 8, the list of affiliated colors for input color 1 802a includes colors 1-8 and 10; and the list of affiliated colors for input color 2 802b includes colors 1, 2, 6, and 8-10.

The weight of an affiliated color in a list of affiliated colors can be adjusted if the affiliated color is found in more than one palette. As described herein, the weight can be adjusted through various aggregation techniques. In determining whether an affiliated color appears in more than one palette, colors can be considered the same (or sufficiently the same) when the color in the other palette has a color distance that is less than a color distance threshold from the affiliated color. In some embodiments, colors that are sufficiently similar can be combined together in a list of affiliated colors and their weights can be combined as well.

To generate a single list of ordered affiliated colors, the weights of the colors from the various affiliated color lists can be normalized and combined. The normalization procedure can be any of those described herein, such as those described with reference to FIG. 7. The result can be an ordered list of affiliated colors, where the ordering of the colors on the list is according to the normalized weight factor.

In some embodiments, the normalization procedure can remove colors that appear in only one affiliated color list or in less than all affiliated color lists. One method of doing this is to multiply the weight factors across the affiliated color lists for each affiliated color. If the affiliated color does not appear in an affiliated color list, then the weight is assigned a value of 0 and the product of the weight factors is 0. Any affiliated color with a normalized weight factor of 0 can be removed from the ordered list of affiliated colors. In the example illustrated in FIG. 8, this procedure would remove colors 3-5, 7, and 9, leaving colors 1, 2, 6, 8, and 10.

As described herein, the affiliated color service 102 can use time-dependent ratings to provide projected affiliated color trends. As further described herein, the affiliated color service 102 can use geography-associated ratings to provide affiliated colors based at least in part on geographical information.

Figure 9:
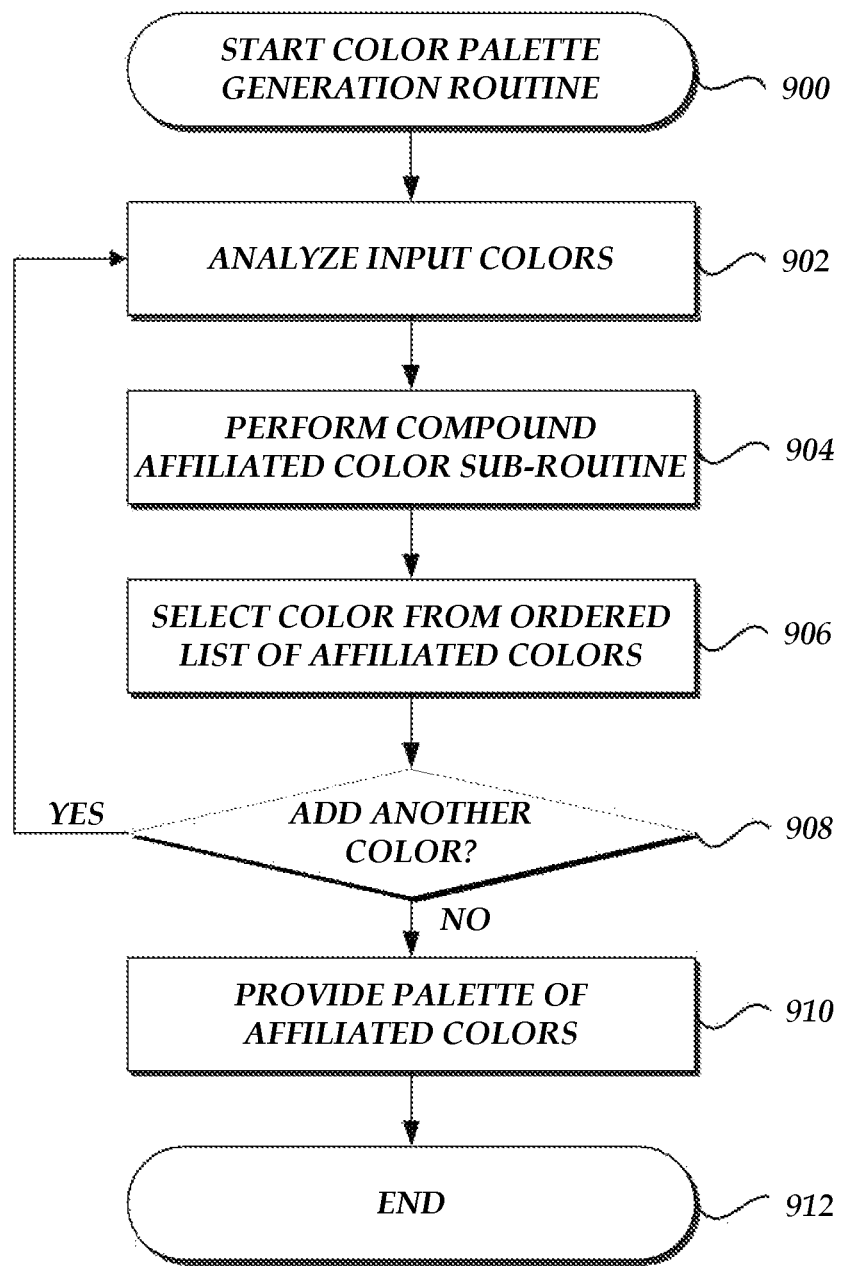
FIG. 9 illustrates a flow diagram of a routine for generating a color palette of affiliated colors from a plurality of initial colors, the routine implemented by an affiliated color service such as that shown in FIG. 1.

Example Affiliated Color Palette Generation Process Using Two or More Input Colors FIG. 9 illustrates a flow diagram of a routine 900 for generating a color palette of affiliated colors from a plurality of initial colors, the routine implemented by an affiliated color service 102. Routine 900 begins at block 902, where the affiliated color service 102 analyzes a plurality of input colors. Analysis of the input colors can include the functions described herein with reference to block 702 in FIG. 7. The input colors can be received as described above with respect to block 702 of routine 700, illustrated in FIG. 7.

At block 904, the affiliated color service 102 performs routine 700, described herein with reference to FIG. 7. In some embodiments, the affiliated color service can move to block 704 upon entering the routine 700 because the input colors have been analyzed in block 902. As described, the output of routine 700 is an ordered list or grouping of affiliated colors based on the plurality of input colors.

At block 906, the affiliated color service 102 selects a color from the ordered list of affiliated colors. The selection can be based on user input by a user via a user interface. For example, routine 900 can be interactive such that a user provides the affiliated service 102 with the input colors and is provided the ordered list of affiliated colors generated at block 904. The user can then select a color from the ordered list and indicate the selection to the affiliated color service 102. In some embodiments, the affiliated color service 102 selects a color from the ordered list of affiliated colors. The selection can be based at least in part on the weighting of the affiliated color, the color distance of the affiliated color from the input colors and/or other affiliated colors on the list, a selection criteria determined by a user or other system, or the like. Selection of the color from the ordered list of affiliated colors adds the color to the palette that includes the input colors. In some embodiments, a plurality of colors can be selected. As described herein, the affiliated color service 102 can recursively provide tentative color palettes to provide a variety of tentative color palettes.

At block 908, the affiliated color service 102 determines whether another color will be added to the palette. If another color is to be added, routine 900 returns to block 902 to analyze the input colors, which now includes the addition of an affiliated color selected in block 506. In some embodiments, the affiliated color that has been added to the palette can be treated differently from the initial input colors. For example, where the affiliated color service 102 restricts the ordered affiliated color list to colors that appear in the affiliated color list for each of the input colors, this same restriction can be removed for any additional affiliated colors added to the affiliated color palette.

If the palette is finished (e.g., no other colors are to be added to the palette), routine 900 proceeds to block 910 where the affiliated color service 102 provides the palette of affiliated colors. As illustrated in FIG. 1, the provided palette of affiliated colors can be stored in palette data store 110, sent to the third party consumers 140, and/or sent to the color palette providers 130. Routine 900 ends at block 912.

Figure 10:
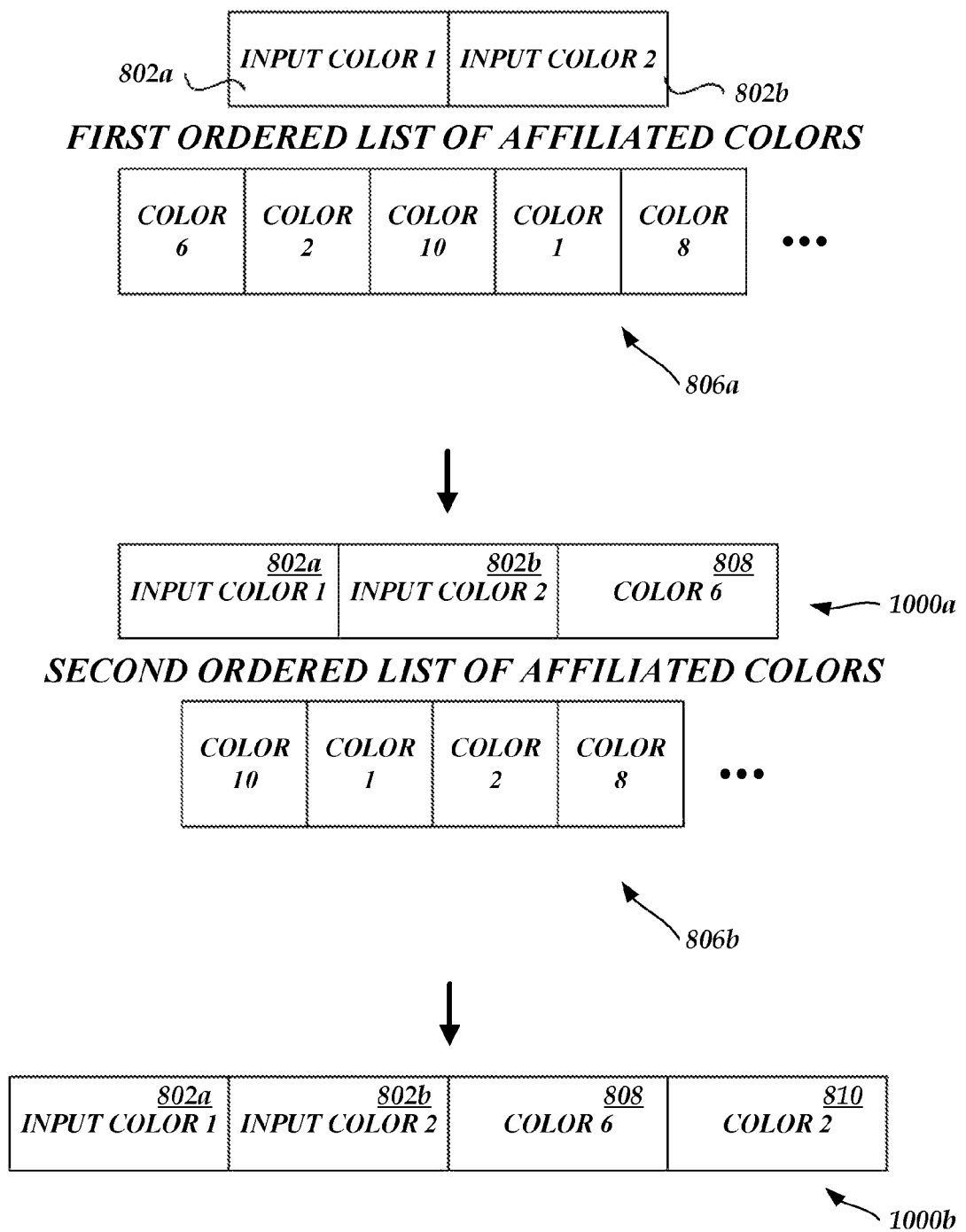
FIG. 10 illustrates example affiliated color palettes generated by the routine of FIG. 9.

FIG. 10 illustrates example affiliated color palettes 1000a, 1000b generated by the routine 900 of FIG. 9. Starting with input colors 802a and 802b, a first ordered list of affiliated colors 806a is generated, as described with reference to FIG. 8. A color can be selected from the first ordered list of affiliated colors 806a. This results in a color palette 1000a that includes the input colors 802a, 802b and the selected color 808 (e.g., color 6 from the first ordered list of affiliated colors). The new color palette 1000a can then be used to generate a second ordered list of affiliated colors that now includes colors associated with the input colors 802a, 802b and the selected color 808. Because new and/or different palettes have been included in the routine to determine the ordered list of affiliated colors, the order of the affiliated colors may change. This process can be repeated to build up a color palette with a plurality of colors, such as color palette 1000b.

In some embodiments, as the number of input colors increases, the number of affiliated colors decreases. The affiliated color service 102, for example, may limit the identified palettes to those that include all of the colors in the palette being built or a majority of the colors in the palette being built. This may desirable to reduce the number of potential colors in the ordered affiliated color list that may result in visually unappealing color combinations. In this way, the palette generation is self-limiting as the more colors in the palette the fewer affiliated colors that are presented.

The input colors 802a, 802b can be determined or provided by a user, a computer system, or a combination of both. For example, a user may want to build an outfit that includes the colors pink and blue. Based on these input colors, the affiliated color service 102 can provide an ordered list of affiliated colors that have been determined by a community of users to go well with both of the input colors. As another example, a user can select the colors pink and blue as input colors and the affiliated color service 102 can be configured to select a one or more additional colors randomly or through another algorithm to provide a suggested color palette (or multiple color palettes). Any of these color palettes could then be used to identify and/or filter potential products for the user.

Depending on the embodiment, certain acts, events, or functions of any of the algorithms described herein can be performed in a different sequence, can be added, merged, or left out altogether (e.g., not all described acts or events are necessary for the practice of the algorithm). Moreover, in certain embodiments, acts or events can be performed concurrently, e.g., through multi-threaded processing, interrupt processing, or multiple processors or processor cores or on other parallel architectures, rather than sequentially.

The various illustrative logical blocks, modules, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be a controller, microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration.

The elements of a method, process, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of computer-readable storage medium known in the art. An exemplary storage medium can be coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal. A software module can comprise computer-executable instructions which cause a hardware processor to execute the computer-executable instructions. The computer-executable instructions can comprise a scripted computer language and/or a compiled computer language. Computer-executable instructions can comprise, for example and without limitation, JAVASCRIPT®, PYTHON™, php, SQL, C, C++, JAVA®, C#, Fortran, BASIC, shell scripts, Perl, or the like.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment. The terms "comprising," "including," "having," "involving," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y or Z," unless specifically stated otherwise, is otherwise understood with the context as used in general to present that an item, term, etc., may be either X, Y or Z, or any combination thereof (e.g., X, Y and/or Z). Thus, such disjunctive language is not generally intended to, and should not, imply that certain embodiments require at least one of X, at least one of Y or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, certain embodiments described herein can be embodied within a form that does not provide all of the features and benefits set forth herein, as some features can be used or practiced separately from others. All changes which come within the meaning and range of equivalency of the claims are to be embraced within their scope.

What is claimed is:

1. A computer-implemented method for generating a color palette, the computer-implemented method comprising:
    under control of a hardware computing device configured with specific computer-executable instructions,
        obtaining a plurality of input colors;
        for each of the plurality of input colors, determining an input color range based at least in part on a color distance from the input color in a color space;
        receiving a plurality of predetermined color palettes, each of the plurality of predetermined color palettes having a plurality of colors and a rating;
        identifying one or more predetermined affiliated color palettes among the plurality of predetermined color palettes, wherein a predetermined affiliated color palette has at least one color within at least one of the input color ranges;
        for each of the plurality of input colors, generating an affiliated color list comprising a plurality of affiliated colors, wherein an affiliated color is a color included in the predetermined affiliated color palette and the affiliated color is outside the input color range of the input color;
        for each affiliated color list, assigning a weight to each affiliated color in the affiliated color list, the weight associated with the rating of the predetermined affiliated color palette having the affiliated color;
        for each affiliated color list, scaling the weight of each affiliated color to a relative popularity of the plurality of input colors; and
        providing an ordered list of affiliated colors comprising at least a portion of the plurality of affiliated colors, wherein an order of the ordered list of affiliated colors is based at least in part on the scaled weight of each of the affiliated colors in the ordered list.

2. The computer-implemented method of claim 1, wherein the rating comprises a number of votes.

3. The computer-implemented method of claim 2, wherein the weight associated with the rating corresponds to the number of votes.

4. The computer-implemented method of claim 1, further comprising:
    for each affiliated color, determining an affiliated color range based at least in part on a second color distance from the affiliated color in the color space,
    wherein assigning the weight to each affiliated color further comprises combining the ratings from the one or more predetermined affiliated color palettes that include a color that is within the affiliated color range.

5. The computer-implemented method of claim 4, wherein:
    the rating comprises a number of votes, and
    combining the rating comprises adding the number of votes.

6. The computer-implemented method of claim 5, wherein the affiliated color with the highest scaled weight is first in the ordered list of affiliated colors.

7. A system comprising:
    a data store configured to store computer-executable instructions; and
    a hardware processor in communication with the data store, the hardware processor configured to execute the computer-executable instructions to at least:
        identify one or more predetermined affiliated color palettes, each predetermined affiliated color palette having a plurality of colors and a rating, at least one of the plurality of colors being within an input color range of at least one of a plurality of input colors;
        identify, for each input color of the plurality of input colors, a grouping of affiliated colors from the identified predetermined affiliated color palettes, the grouping of affiliated colors being associated with the input color;
        assign, for each grouping of affiliated colors, a weight to each affiliated color in the grouping, the weight corresponding to the rating of the predetermined affiliated color palette having the affiliated color;
        adjust, for each grouping of affiliated colors, the weight of each affiliated color according to a relative popularity of the associated input color; and
        combining the affiliated colors from the groupings of affiliated colors, wherein the combined affiliated colors are ordered according to the respective adjusted weights of the affiliated colors.

8. The system of claim 7, wherein the adjusted weight of an affiliated color is the weight of the affiliated color divided by a sum of all the weights of all the combined affiliated colors.

9. The system of claim 7, wherein the hardware processor is further configured to execute the computer-executable instructions to remove an affiliated color from the combined affiliated colors when the affiliated color does not appear in each grouping of affiliated colors.

10. The system of claim 7, wherein the adjusted weight of each affiliated color is based at least in part on a trend in the rating of the predetermined affiliated color palette having the affiliated color exhibited over time.

11. The system of claim 7, wherein the adjusted weight of each affiliated color is based at least in part on the rating of the predetermined affiliated color palette having the affiliated color, the rating depending at least in part on a geographical location.

12. The system of claim 7, wherein the hardware processor is further configured to execute the computer-executable instructions to determine, for each affiliated color, a product of the weights of the affiliated color in each of the groupings of affiliated colors.

13. The system of claim 12, wherein, if an affiliated color is not included in a grouping of affiliated colors, a weight of the affiliated color is set to 0 when determining the product of the weights.

14. A non-transitory computer readable storage medium storing computer-executable instructions that when executed by a processor perform operations comprising:
   identifying one or more predetermined affiliated color palettes, each predetermined affiliated color palette having a plurality of colors and a rating, at least one of the plurality of colors being within an input color range of at least one of a plurality of input colors;
   identifying, for each input color of the plurality of input colors, a grouping of affiliated colors from the identified predetermined affiliated color palettes, the grouping of affiliated colors being associated with the input color;
   assigning, for each grouping of affiliated colors, a weight to each affiliated color in the grouping, the weight corresponding to the rating of the predetermined affiliated color palette having the affiliated color;
   adjusting, for each grouping of affiliated colors, the weight of each affiliated color according to a relative popularity of the associated input color; and
   combining the affiliated colors from the groupings of affiliated colors, wherein the combined affiliated colors are ordered according to the respective adjusted weights of the affiliated colors.

15. The non-transitory computer readable storage medium of claim 14, wherein the input color range is determined using a human color distance formula.

16. The non-transitory computer readable storage medium of claim 14, wherein the stored computer-executable instructions further comprise:
   selecting a first tentative color and a second tentative color from the combined affiliated colors;
   determining a first tentative grouping of affiliated colors by identifying predetermined affiliated color palettes that include at least one color within the input color range and at least one color within an input color range of the first tentative color in a color space; and
   determining a second tentative grouping of affiliated colors by identifying predetermined affiliated color palettes that include at least one color within the input color range and at least one color within an input color range of the second tentative color in the color space.

17. The non-transitory computer readable storage medium of claim 14, wherein the stored computer-executable instructions further comprise:
   analyzing ratings of the predetermined affiliated color palettes as a function of time; and
   providing a grouping of one or more affiliated colors based at least in part on a trend in the ratings of the predetermined affiliated color palettes exhibited over time.

18. The non-transitory computer readable storage medium of claim 17, wherein analyzing the ratings of the predetermined affiliated color palettes further comprises determining a directional shift exhibited over time in a color space.

19. The non-transitory computer readable storage medium of claim 14, wherein adjusting the weight of each affiliated color comprises dividing the weight of the affiliated color by a normalization factor.

20. The non-transitory computer readable storage medium of claim 19, wherein the normalization factor comprises a sum of the weights of the affiliated colors in each of the groupings of affiliated colors.

* * * * *